United States Patent
Lin et al.

(10) Patent No.: US 12,457,636 B2
(45) Date of Patent: Oct. 28, 2025

(54) METHODS, BASE STATION AND TERMINAL DEVICE FOR TWO-STEP RANDOM ACCESS PROCEDURE

(71) Applicant: Telefonaktiebolaget LM Ericsson (publ), Stockholm (SE)

(72) Inventors: Zhipeng Lin, Nanjing (CN); Robert Mark Harrison, Grapevine, TX (US); Asbjörn Grövlen, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 493 days.

(21) Appl. No.: 17/419,673

(22) PCT Filed: Aug. 16, 2019

(86) PCT No.: PCT/CN2019/101097
§ 371 (c)(1),
(2) Date: Jun. 29, 2021

(87) PCT Pub. No.: WO2020/134121
PCT Pub. Date: Jul. 2, 2020

(65) Prior Publication Data
US 2023/0096520 A1     Mar. 30, 2023

(30) Foreign Application Priority Data

Dec. 29, 2018 (WO) ................ PCT/CN2018/125611

(51) Int. Cl.
*H04W 74/00* (2009.01)
*H04L 5/00* (2006.01)
(Continued)

(52) U.S. Cl.
CPC ......... *H04W 74/006* (2013.01); *H04L 5/0094* (2013.01); *H04W 74/0836* (2024.01); *H04W 74/0833* (2013.01); *H04W 74/0838* (2024.01)

(58) Field of Classification Search
CPC .......... H04W 74/006; H04W 74/0833; H04W 48/12; H04W 72/02; H04W 74/004; H04L 5/0094
See application file for complete search history.

(56) References Cited

U.S. PATENT DOCUMENTS

2017/0164350 A1* 6/2017 Sun ........................ H04L 5/0007
2018/0054800 A1* 2/2018 Yeo ........................ H04L 5/0057
(Continued)

FOREIGN PATENT DOCUMENTS

| CN | 108432331 A | 8/2018 |
|---|---|---|
| EP | 3346777 A2 | 7/2018 |

(Continued)

OTHER PUBLICATIONS

U.S. Appl. No. 62/751,073, filed Oct. 26, 2018 (Year: 2018).*
(Continued)

*Primary Examiner* — Sun Jong Kim
(74) *Attorney, Agent, or Firm* — Nicholson De Vos Webster & Elliott LLP

(57) ABSTRACT

Methods, a base station, and a terminal device for a two-step random access procedure are disclosed. The base station transmits a first message indicating a subcarrier spacing (SCS) of a physical uplink shared channel (PUSCH) which is to be used for a second message in the two-step random access procedure, through an air interface. The SCS of the PUSCH is same as an SCS used for message 3 in a four-step random access procedure. The base station receives the second message based on the SCS of the PUSCH through the air interface in the two-step random access procedure.

4 Claims, 10 Drawing Sheets

(51) Int. Cl.
*H04W 74/0833* (2024.01)
*H04W 74/0836* (2024.01)
*H04W 74/0838* (2024.01)

(56) References Cited

U.S. PATENT DOCUMENTS

| | | | |
|---|---|---|---|
| 2018/0205516 A1 | 7/2018 | Jung et al. | |
| 2019/0174437 A1* | 6/2019 | Lyu | H04L 5/0048 |
| 2019/0364599 A1* | 11/2019 | Islam | H04L 5/0048 |
| 2020/0053786 A1* | 2/2020 | Kim | H04W 56/00 |
| 2020/0275398 A1* | 8/2020 | Da | H04L 5/0092 |
| 2021/0152312 A1* | 5/2021 | Xiong | H04W 72/23 |
| 2021/0243814 A1* | 8/2021 | Zhang | H04W 74/0833 |

FOREIGN PATENT DOCUMENTS

| | | |
|---|---|---|
| WO | 2018175809 A1 | 9/2018 |
| WO | 2018203727 A1 | 11/2018 |

OTHER PUBLICATIONS

U.S. Appl. No. 62/675,629, Specification filed May 23, 2018 (Year: 2018).*
Ericsson (Rapporteur), "Introduction of SA", 3GPP TSG-WG2 Meeting #102, R2-180xxxx, Busan, South Korea, May 21-25, 2018, 432 pages.
Ericsson, "Remaining issues for RA-RNTI formula", 3GPP TSG-RAN WG2 #101, Tdoc R2-1803201, Athens, Greece, Feb. 26-Mar. 2, 2018, 2 pages.
Examination Report, IN App. No. 202147033415, Jun. 16, 2022, 7 pages.
Mediatek Inc., "On 2-step random access procedure and physical channel in NR", 3GPP TSG RAN WG1 Meeting #87, R1-1700172, Spokane, USA, Jan. 16-20, 2017, 7 pages.
Mediatek Inc., "Remaining Details on Bandwidth Part Operation in NR", 3GPP TSG RAN WG1 Meeting #93, R1-1806775, Busan, Korea, May 21-May 25, 2018, 11 pages.
Notice of Reasons for Refusal, JP App. No. 2021-538191, Jun. 22, 2022, 6 pages (3 pages of English Translation and 3 pages of Original Document).
Supplementary European Search Report and Search Opinion, EP App. No. 19905167.3, Jul. 28, 2022, 12 pages.
Office Action, AR App. No. P20190103877, Apr. 10, 2023, 7 Pages of Original Document only.
Decision to Grant, JP App. No. 2021-538191, Sep. 13, 2022, 6 pages (3 pages of English Translation and 3 pages of Original Document).
Office Action, AP App. No. AP/P/2021/013159, Oct. 18, 2022, 5 pages.
International Preliminary Report on Patentability, App. No. PCT/CN2019/101097, Nov. 4, 2020, 20 pages.
International Search Report and Written Opinion for Application No. PCT/CN2019/101097, dated Nov. 20, 2019, 9 pages.
ETSI MCC, "Report of 3GPP TSG RAN WG2 meeting #103bis," Oct. 8-12, 2018, 240 pages, 3GPP TSG-RAN WG2 meeting #104, R2-1816201, Chengdu, China.
ZTE Corporation et al., "New work item: 2-step RACH for NR," Dec. 10-13, 2018, 5 pages, 3GPP TSG RAN Meeting #82, RP-182894, Sorrento, Italy.
3GPP TS 38.211 V15.3.0, "3rd Generation Partnership Project; Technical Specification Group Radio Access Network; NR; Physical channels and modulation (Release 15)," Sep. 2018, 96 pages, 3GPP Organizational Partners.
Office Action, CN App. No. 201980086764.8), Oct. 12, 2023, (7 pages of English Translation and 7 pages of Original Document).
Qualcomm Incorporated, "Prach design consideration", 3GPP TSG-RAN WG1 #88, R1-1702592, Feb. 13-17, 2017, pp. 1-19.
Communication pursuant to Article 94(3) EPC, EP App. No. 19905167.3, May 15, 2024, 6 pages.
Decision to Grant, CN App. No. 201980086764.8, Mar. 16, 2024, 6 pages (2 pages of English Translation and 4 pages of Original Document).

* cited by examiner

Receive a request message through an air interface in two-step random access procedure based on a predefined SCS of a preamble and a predefined SCS of a PUSCH ~502

FIG. 5

Transmit a request message through an air interface in two-step random access procedure based on a predefined SCS of a preamble and a predefined SCS of a PUSCH ~602

FIG. 6

Transmit a first message indicating an SCS of at least one of a preamble and a PUSCH which are to be used for a second message in two-step random access procedure, wherein the SCS of the PUSCH is the same as an SCS used for message 3 in four-step random access procedure ~702

Receive the second message based on the SCS of the PUSCH through the air interface in two-step random access procedure ~704

FIG. 7

METHODS, BASE STATION AND TERMINAL DEVICE FOR TWO-STEP RANDOM ACCESS PROCEDURE

CROSS-REFERENCE TO RELATED APPLICATIONS

This application is a National stage of International Application No. PCT/CN2019/101097, filed Aug. 16, 2019, which claims priority to International Application No. PCT/CN2018/125611, filed Dec. 29, 2018, which are hereby incorporated by reference.

TECHNICAL FIELD

Embodiments of the disclosure generally relate to wireless communication, and, more particularly, to methods, a base station and a terminal device for two-step random access procedure.

BACKGROUND

This section introduces aspects that may facilitate better understanding of the present disclosure. Accordingly, the statements of this section are to be read in this light and are not to be understood as admissions about what is in the prior art or what is not in the prior art.

In new radio (NR) system, a four-step approach as shown in FIG. 1 may be used for random access procedure. In this approach, the user equipment (UE) detects a synchronization signal (SS) and decodes the system information broadcasted in radio resource control (RRC) messages, followed by transmitting a physical random access channel (PRACH) preamble (message 1) in the uplink. The next generation node B (gNB) replies with a random access response (RAR, message 2). The UE then transmits a UE identification (message 3) on physical uplink shared channel (PUSCH).

The UE transmits PUSCH (message 3) after receiving a timing advance command in the RAR, allowing PUSCH to be received with a timing accuracy within the cyclic prefix (CP). Without this timing advance, a very large CP would be needed in order to be able to demodulate and detect PUSCH, unless the system is applied in a cell with very small distance between UE and gNB. Since NR will also support larger cells with a need for providing a timing advance to the UE, the four-step approach is needed for random access procedure.

In the 4-step random access channel (RACH) procedure, the subcarrier spacing (or numerology) of PRACH and message 3 are defined in NR release 15 as below. The subcarrier spacing (SCS) can be 1.25 kHz, 5 kHz for PRACH preamble with length L=839, and 15 kHz, 30 kHz, 60 kHz or 120 kHz SCS can be used for PRACH preamble with length L=139. For contention-based NR 4-step random access (RA) procedure or physical downlink control channel (PDCCH) triggered contention free random access (CFRA), the SCS for message 1 is configured in the RACH configuration in system information block 1 (SIB1). For contention-free RA procedure for handover, the SCS for message 1 is provided in the handover command. For message 3 PUSCH, the numerology can be 15 kHz or 30 kHz for frequency range 1, and 60 kHz or 120 kHz for frequency range 2. The actual SCS used for message 3 PUSCH is configured separately from the SCS for message 1.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide improved solutions for two-step random access procedure.

According to a first aspect of the disclosure, there is provided a method in a base station. The method may comprise transmitting a first message indicating an SCS of at least one of a preamble and a PUSCH which are to be used for a second message in two-step random access procedure, through an air interface. The method may further comprise receiving the second message based on the SCS of the at least one of the preamble and the PUSCH through the air interface in two-step random access procedure.

In an embodiment of the disclosure, the first message may comprise at least one of a first parameter indicating the SCS of the preamble and a second parameter indicating the SCS of the PUSCH.

In an embodiment of the disclosure, the first message may be a RRC message or system information block type 1 (SIB1) message. The second message may be message A in two step random access procedure.

In an embodiment of the disclosure, the first parameter may be a parameter in a RACH-ConfigCommon information element (IE).

In an embodiment of the disclosure, the second parameter may be a parameter in a RACH-ConfigCommon IE or a bandwidth part (BWP) IE.

In an embodiment of the disclosure, the first parameter may be configured to be applicable to a terminal device when a short preamble is used by the terminal device.

In an embodiment of the disclosure, the first parameter may be configured to have the same value as the second parameter.

In an embodiment of the disclosure, the second message may be received based on an SCS of a PUSCH which is the same as an SCS used for message 3 in four-step random access procedure.

In an embodiment of the disclosure, the second message may be received based on an SCS of a preamble which is the same as an SCS used for message 1 in four-step random access procedure.

According to a second aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may transmit a first message indicating an SCS of at least one of a preamble and a PUSCH which are to be used for a second message in two-step random access procedure, through an air interface. The base station may receive the second message based on the SCS of the at least one of the preamble and the PUSCH through the air interface in two-step random access procedure.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to a third aspect of the disclosure, there is provided a method in a terminal device. The method may comprise receiving, through an air interface, a first message indicating an SCS of at least one of a preamble and a PUSCH which are to be used for a second message in a two-step random access procedure. The method may further comprise transmitting the second message based on the SCS of the at least one of the preamble and the PUSCH, through the air interface in two-step random access procedure.

In an embodiment of the disclosure, the first message may comprise at least one of a first parameter indicating the SCS of the preamble and a second parameter indicating the SCS of the PUSCH.

In an embodiment of the disclosure, the first message may be a RRC message or SIB1 message. The second message may be message A in two step random access procedure.

In an embodiment of the disclosure, the first parameter may be a parameter in a RACH-ConfigCommon IE.

In an embodiment of the disclosure, the second parameter may be a parameter in a RACH-ConfigCommon IE or a BWP IE.

In an embodiment of the disclosure, the second message may be transmitted based on the SCS of the preamble indicated by the first parameter when a short preamble is used by the terminal device.

In an embodiment of the disclosure, the first parameter may be configured to have the same value as the second parameter.

In an embodiment of the disclosure, the second message may be transmitted based on an SCS of a PUSCH which is the same as an SCS used for message 3 in four-step random access procedure.

In an embodiment of the disclosure, the second message may be transmitted based on an SCS of a preamble which is the same as an SCS used for message 1 in four-step random access procedure.

According to a fourth aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The terminal device may receive, through an air interface, a first message indicating an SCS of at least one of a preamble and a PUSCH which are to be used for a second message in two-step random access procedure. The terminal device may transmit the second message based on the SCS of the at least one of the preamble and the PUSCH, through the air interface in two-step random access procedure.

In an embodiment of the disclosure, the method may further comprise, at the terminal device, receiving the user data from the base station.

According to a fifth aspect of the disclosure, there is provided a method in a base station. The method may comprise receiving a request message through an air interface in two-step random access procedure based on an SCS of a preamble and an SCS of a PUSCH. The SCS of the preamble may be predefined to be either fixed or the same as an SCS used for message 1 in four-step random access procedure. The SCS of the PUSCH may be predefined to be either fixed or the same as an SCS used for message 3 in four-step random access procedure.

According to a sixth aspect of the disclosure, there is provided a method implemented in a communication system including a host computer, a base station and a terminal device. The method may comprise, at the host computer, receiving, from the base station, user data originating from a transmission which the base station has received from the terminal device. The base station may receive a request message through an air interface in two-step random access procedure based on an SCS of a preamble and an SCS of a PUSCH. The SCS of the preamble may be predefined to be either fixed or the same as an SCS used for message 1 in four-step random access procedure. The SCS of the PUSCH may be predefined to be either fixed or the same as an SCS used for message 3 in four-step random access procedure.

In an embodiment of the disclosure, the method may further comprise, at the base station, receiving the user data from the terminal device.

In an embodiment of the disclosure, the method may further comprise, at the base station, initiating a transmission of the received user data to the host computer.

According to a seventh aspect of the disclosure, there is provided a method in a terminal device. The method may comprise transmitting a request message through an air interface in two-step random access procedure based on an SCS of a preamble and an SCS of a PUSCH. The SCS of the preamble may be predefined to be either fixed or the same as an SCS used for message 1 in four-step random access procedure. The SCS of the PUSCH may be predefined to be either fixed or the same as an SCS used for message 3 in four-step random access procedure.

In an embodiment of the disclosure, the method may further comprise providing user data. The method may further comprise forwarding the user data to a host computer via the transmission to a base station.

According to an eighth aspect of the disclosure, there is provided a method implemented in a communication system including a host computer, a base station and a terminal device. The method may comprise, at the host computer, receiving user data transmitted to the base station from the terminal device. The terminal device may transmit a request message through an air interface in two-step random access procedure based on an SCS of a preamble and a SCS of a PUSCH. The SCS of the preamble may be predefined to be either fixed or the same as an SCS used for message 1 in four-step random access procedure. The SCS of the PUSCH may be predefined to be either fixed or the same as an SCS used for message 3 in four-step random access procedure.

In an embodiment of the disclosure, the method may further comprise, at the terminal device, providing the user data to the base station.

In an embodiment of the disclosure, the method may further comprise, at the terminal device, executing a client application, thereby providing the user data to be transmitted. The method may further comprise, at the host computer, executing a host application associated with the client application.

In an embodiment of the disclosure, the method may further comprise, at the terminal device, executing a client application. The method may further comprise, at the terminal device, receiving input data to the client application. The input data may be provided at the host computer by executing a host application associated with the client application. The user data to be transmitted may be provided by the client application in response to the input data.

According to a ninth aspect of the disclosure, there is provided a method in a base station. The method may comprise transmitting a first message indicating an SCS of at least one of a preamble and a PUSCH which are to be used for a second message in two-step random access procedure, through an air interface. The SCS of the PUSCH may be the same as an SCS used for message 3 in four-step random access procedure. The method may further comprise receiving the second message based on the SCS of the PUSCH through the air interface in two-step random access procedure.

According to a tenth aspect of the disclosure, there is provided a method in a terminal device. The method may comprise receiving, through an air interface, a first message indicating an SCS of at least one of a preamble and a PUSCH which are to be used for a second message in two-step random access procedure. The SCS of the PUSCH may be the same as an SCS used for message 3 in four-step random access procedure. The method may further comprise transmitting the second message based on the SCS of the PUSCH, through the air interface in two-step random access procedure.

According to an eleventh aspect of the disclosure, there is provided a method implemented in a communication system including a base station and a terminal device. The method may comprise, at the base station, transmitting a first message indicating an SCS of at least one of a preamble and a PUSCH which are to be used for a second message in two-step random access procedure, through an air interface. The SCS of the PUSCH may be the same as an SCS used for message 3 in four-step random access procedure. The method may further comprise, at the terminal device, receiving, through an air interface, the first message indicating the SCS of at least one of the preamble and the PUSCH which are to be used for the second message in two-step random access procedure. The method may further comprise, at the terminal device, transmitting the second message based on the SCS of the PUSCH, through the air interface in two-step random access procedure. The method may further comprise, at the base station, receiving the second message based on the SCS of the PUSCH through the air interface in two-step random access procedure.

According to a twelfth aspect of the disclosure, there is provided a base station. The base station may comprise at least one processor and at least one memory. The at least one memory may contain instructions executable by the at least one processor, whereby the base station may be operative to transmit a first message indicating an SCS of at least one of a preamble and a PUSCH which are to be used for a second message in two-step random access procedure, through an air interface. The base station may be further operative to receive the second message based on the SCS of the at least one of the preamble and the PUSCH through the air interface in two-step random access procedure.

In an embodiment of the disclosure, the base station may be operative to perform the method according to the above first aspect.

According to a thirteenth aspect of the disclosure, there is provided a communication system including a host computer. The host computer may comprise processing circuitry configured to provide user data and a communication interface configured to forward the user data to a cellular network for transmission to a terminal device. The cellular network may comprise a base station having a radio interface and processing circuitry. The base station's processing circuitry may be configured to transmit a first message indicating an SCS of at least one of a preamble and a PUSCH which are to be used for a second message in two-step random access procedure, through an air interface. The base station's processing circuitry may be further configured to receive the second message based on the SCS of the at least one of the preamble and the PUSCH through the air interface in two-step random access procedure.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

According to a fourteenth aspect of the disclosure, there is provided a terminal device. The terminal device may comprise at least one processor and at least one memory. The at least one memory may contain instructions executable by the at least one processor, whereby the terminal device may be operative to receive, through an air interface, a first message indicating an SCS of at least one of a preamble and a PUSCH which are to be used for a second message in two-step random access procedure. The terminal device may be further operative to transmit the second message based on the SCS of the at least one of the preamble and the PUSCH, through the air interface in two-step random access procedure.

In an embodiment of the disclosure, the terminal device may be operative to perform the method according to the above third aspect.

According to a fifteenth aspect of the disclosure, there is provided a communication system including a host computer. The host computer may comprise processing circuitry configured to provide user data and a communication interface configured to forward user data to a cellular network for transmission to a terminal device. The terminal device may comprise a radio interface and processing circuitry. The terminal device's processing circuitry may be configured to receive, through an air interface, a first message indicating an SCS of at least one of a preamble and a PUSCH which are to be used for a second message in two-step random access procedure. The terminal device's processing circuitry may be configured to transmit the second message based on the SCS of the at least one of the preamble and the PUSCH, through the air interface in two-step random access procedure.

In an embodiment of the disclosure, the communication system may further include the terminal device.

In an embodiment of the disclosure, the cellular network may further include a base station configured to communicate with the terminal device.

In an embodiment of the disclosure, the processing circuitry of the host computer may be configured to execute a host application, thereby providing the user data. The terminal device's processing circuitry may be configured to execute a client application associated with the host application.

According to a sixteenth aspect of the disclosure, there is provided a base station. The base station may comprise at least one processor and at least one memory. The at least one memory may contain instructions executable by the at least one processor, whereby the base station may be operative to receive a request message through an air interface in two-step random access procedure based on an SCS of a preamble and an SCS of a PUSCH. The SCS of the preamble may be predefined to be either fixed or the same as an SCS used for message 1 in four-step random access procedure.

The SCS of the PUSCH is predefined to be either fixed or the same as an SCS used for message 3 in four-step random access procedure.

According to a seventeenth aspect of the disclosure, there is provided a communication system including a host computer. The host computer may comprise a communication interface configured to receive user data originating from a transmission from a terminal device to a base station. The base station may comprise a radio interface and processing circuitry. The base station's processing circuitry may be configured to receive a request message through an air interface in two-step random access procedure based on an SCS of a preamble and an SCS of a PUSCH. The SCS of the preamble may be predefined to be either fixed or the same as an SCS used for message 1 in four-step random access procedure. The SCS of the PUSCH may be predefined to be either fixed or the same as an SCS used for message 3 in four-step random access procedure.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application. The terminal device may be configured to execute a client application associated with the host application, thereby providing the user data to be received by the host computer.

According to an eighteenth aspect of the disclosure, there is provided a terminal device. The terminal device may comprise at least one processor and at least one memory. The at least one memory may contain instructions executable by the at least one processor, whereby the terminal device may be operative to transmit a request message through an air interface in two-step random access procedure based on an SCS of a preamble and an SCS of a PUSCH. The SCS of the preamble may be predefined to be either fixed or the same as an SCS used for message 1 in four-step random access procedure. The SCS of the PUSCH may be predefined to be either fixed or the same as an SCS used for message 3 in four-step random access procedure.

According to a nineteenth aspect of the disclosure, there is provided a communication system including a host computer. The host computer may comprise a communication interface configured to receive user data originating from a transmission from a terminal device to a base station. The terminal device may comprise a radio interface and processing circuitry. The terminal device's processing circuitry may be configured to transmit a request message through an air interface in two-step random access procedure based on an SCS of a preamble and a SCS of a PUSCH. The SCS of the preamble may be predefined to be either fixed or the same as an SCS used for message 1 in four-step random access procedure. The SCS of the PUSCH may be predefined to be either fixed or the same as an SCS used for message 3 in four-step random access procedure.

In an embodiment of the disclosure, the communication system may further include the terminal device.

In an embodiment of the disclosure, the communication system may further include the base station. The base station may comprise a radio interface configured to communicate with the terminal device and a communication interface configured to forward to the host computer the user data carried by a transmission from the terminal device to the base station.

In an embodiment of the disclosure, the processing circuitry of the host computer may be configured to execute a host application. The terminal device's processing circuitry may be configured to execute a client application associated with the host application, thereby providing the user data.

In an embodiment of the disclosure, the processing circuitry of the host computer may be configured to execute a host application, thereby providing request data. The terminal device's processing circuitry may be configured to execute a client application associated with the host application, thereby providing the user data in response to the request data.

According to a twentieth aspect of the disclosure, there is provided a base station. The base station may comprise at least one processor and at least one memory. The at least one memory may contain instructions executable by the at least one processor, whereby the base station may be operative to transmit a first message indicating an SCS of at least one of a preamble and a PUSCH which are to be used for a second message in two-step random access procedure, through an air interface. The SCS of the PUSCH may be the same as an SCS used for message 3 in four-step random access procedure. The base station may be further operative to receive the second message based on the SCS of the PUSCH through the air interface in two-step random access procedure.

According to a twenty-first aspect of the disclosure, there is provided a terminal device. The terminal device may comprise at least one processor and at least one memory. The at least one memory may contain instructions executable by the at least one processor, whereby the terminal device may be operative to receive, through an air interface, a first message indicating an SCS of at least one of a preamble and a PUSCH which are to be used for a second message in two-step random access procedure. The SCS of the PUSCH may be the same as an SCS used for message 3 in four-step random access procedure. The terminal device may be further operative to transmit the second message based on the SCS of the PUSCH, through the air interface in two-step random access procedure.

According to a twenty-second aspect of the disclosure, there is provided a computer program product. The computer program product may comprise instructions which when executed by at least one processor, cause the at least one processor to perform the method according to any of the above first, third, fifth, seventh, ninth and tenth aspects.

According to a twenty-third aspect of the disclosure, there is provided a computer readable storage medium. The computer readable storage medium may comprise instructions which when executed by at least one processor, cause the at least one processor to perform the method according to any of the above first, third, fifth, seventh, ninth and tenth aspects.

According to a twenty-fourth aspect of the disclosure, there is provided a base station. The base station may comprise a transmission module for transmitting a first message indicating an SCS of at least one of a preamble and a PUSCH which are to be used for a second message in two-step random access procedure, through an air interface. The base station may further comprise a reception module for receiving the second message based on the SCS of the at least one of the preamble and the PUSCH through the air interface in two-step random access procedure.

According to a twenty-fifth aspect of the disclosure, there is provided a terminal device. The terminal device may comprise a reception module for receiving, through an air interface, a first message indicating an SCS of at least one of a preamble and a PUSCH which are to be used for a second message in two-step random access procedure. The terminal device may further comprise a transmission module for transmitting the second message based on the SCS of the at least one of the preamble and the PUSCH, through the air interface in two-step random access procedure.

According to a twenty-sixth aspect of the disclosure, there is provided a base station. The base station may comprise a reception module for receiving a request message through an air interface in two-step random access procedure based on an SCS of a preamble and an SCS of a PUSCH. The SCS of the preamble may be predefined to be either fixed or the same as an SCS used for message 1 in four-step random access procedure. The SCS of the PUSCH is predefined to be either fixed or the same as an SCS used for message 3 in four-step random access procedure.

According to a twenty-seventh aspect of the disclosure, there is provided a terminal device. The terminal device may comprise a transmission module for transmitting a request message through an air interface in two-step random access procedure based on an SCS of a preamble and an SCS of a PUSCH. The SCS of the preamble may be predefined to be either fixed or the same as an SCS used for message 1 in four-step random access procedure. The SCS of the PUSCH may be predefined to be either fixed or the same as an SCS used for message 3 in four-step random access procedure.

According to a twenty-eighth aspect of the disclosure, there is provided a base station. The base station may comprise a transmission module for transmitting a first message indicating an SCS of at least one of a preamble and a PUSCH which are to be used for a second message in two-step random access procedure, through an air interface. The SCS of the PUSCH may be the same as an SCS used for message 3 in four-step random access procedure. The base station may further comprise a reception module for receiving the second message based on the SCS of the PUSCH through the air interface in two-step random access procedure.

According to a twenty-ninth aspect of the disclosure, there is provided a terminal device. The terminal device may comprise a reception module for receiving, through an air interface, a first message indicating an SCS of at least one of a preamble and a PUSCH which are to be used for a second message in two-step random access procedure. The SCS of the PUSCH may be the same as an SCS used for message 3 in four-step random access procedure. The terminal device may further comprise a transmission module for transmitting the second message based on the SCS of the PUSCH, through the air interface in two-step random access procedure.

Some embodiment(s) described herein may facilitate the implementation of the two-step random access procedure.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 5 is a flowchart illustrating a method in a base station according to another embodiment of the disclosure;

FIG. 6 is a flowchart illustrating a method in a terminal device according to another embodiment of the disclosure;

FIG. 7 is a flowchart illustrating a method in a base station according to another embodiment of the disclosure;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
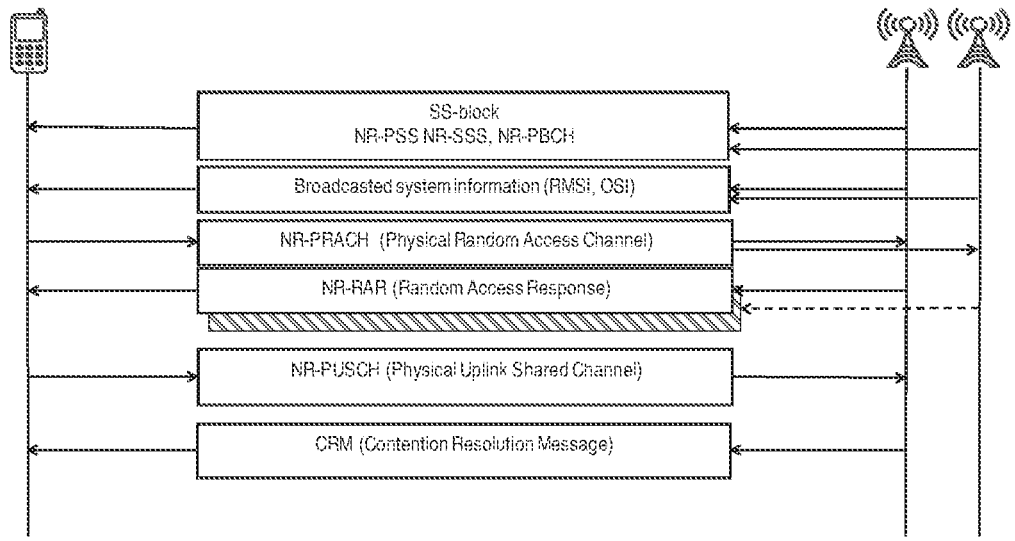
FIG. 1 is a diagram illustrating a four-step random access procedure in NR.
Figure 2:
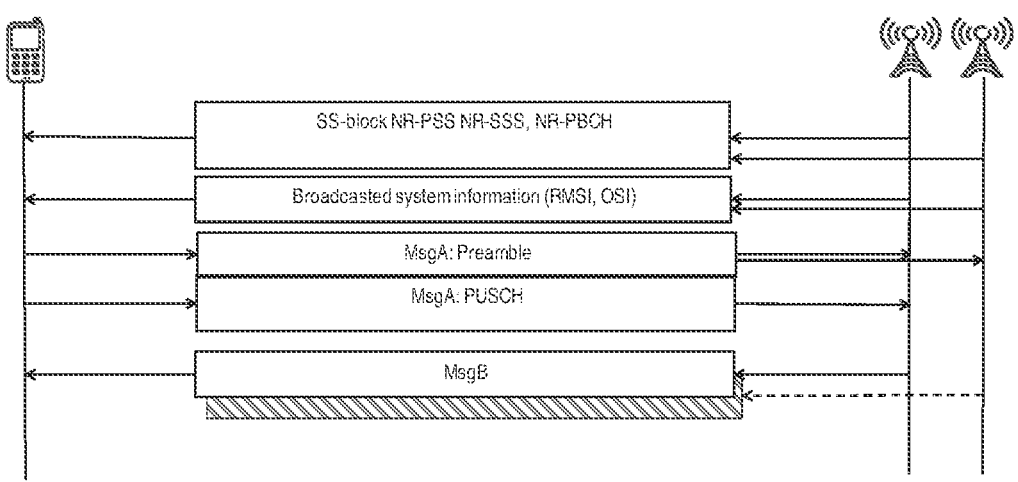
FIG. 2 is a diagram illustrating a two-step random access procedure in NR.

A 2-step RACH procedure has been approved as a work item for NR release 16. As illustrated in FIG. 2, the initial access is completed in only two steps. At the first step, the UE sends a message A including random access preamble together with higher layer data such as radio resource control (RRC) connection request possibly with some small payload on PUSCH. At the second step, the gNB sends a RAR (actually called message B) including UE identifier assignment, timing advance information, and contention resolution message, etc.

In 2-step RACH procedure, the preamble and message 3 PUSCH will be transmitted by UE in one message called message A before UE receives the random access response (message B). Therefore, it would be desirable to provide a solution for determining the numerology (or SCS) of PUSCH and preamble for the detection of preamble and the decoding of PUSCH in this message A.

The present disclosure proposes improved solutions for two-step random access procedure. These solutions may be applied to a wireless communication system including a terminal device and a base station. The terminal device can communicate through a radio access communication link with the base station. The base station can provide radio access communication links to terminal devices that are within its communication service cell. The base station may be, for example, a gNB in NR. Note that the communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3rd generation partnership project (3GPP) context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Now, several embodiments will be described to explain the improved solutions for two-step random access procedure. As a first embodiment, two new parameters may be introduced in a signalling message (or messages) such as a RRC message (e.g. in RACH configuration in SIB1). One new parameter may be used to indicate the SCS of preamble in message A and the other new parameter may be used to indicate the SCS of PUSCH in message A.

As an exemplary example, the new parameters may be defined in RACH-ConfigCommon information element (IE) as below.

msgA-preamble-SubcarrierSpacing

Subcarrier spacing of preamble in msgA when a 2-step RACH procedure is applied. Only the values 15 or 30 kHz (<6 GHz), 60 or 120 kHz (>6 GHz) are applicable. Corresponds to L1 parameter 'prach-Msg1SubcarrierSpacing' (see 3GPP technical specification (TS) 38.211, section FFS_Section). If absent, the UE applies the SCS as derived from the prach-ConfigurationIndex in RACH-ConfigGeneric (see tables Table 6.3.3.1-1 and Table 6.3.3.2-2, TS 38.211). The value also applies to contention free random access (RACH-ConfigDedicated), to SI-request and to contention based beam failure recovery (CB-BFR). But it does not apply for contention free beam failure recovery (CF-BFR) (see BeamFailureRecoveryConfig).

msgA-pusch-SubcarrierSpacing

Subcarrier spacing of PUSCH in msgA when a 2-step RACH procedure is applied. Only the values 15, 30, or 60 kHz (<6 GHz), and 60 or 120 kHz (>6 GHz) are applicable.

For example, the updated RACH-ConfigCommon IE may be represented as below. The new parameters are highlighted with underlines.

| RACH-ConfigCommon IE |
|---|
| ```
-- ASN1START
-- TAG-RACH-CONFIG-COMMON-START
RACH-ConfigCommon ::=                    SEQUENCE {
    rach-ConfigGeneric                   RACH-ConfigGeneric,
    totalNumberOfRA-Preambles            INTEGER (1..63)
OPTIONAL,  -- Need S
    ssb-perRACH-OccasionAndCB-PreamblesPerSSB    CHOICE {
        oneEighth                        ENUMERATED
{n4, n8, n12, n16, n20, n24, n28, n32, n36, n40, n44, n48, n52, n56, n60, n64},
        oneFourth                        ENUMERATED
{n4, n8, n12, n16, n20, n24, n28, n32, n36, n40, n44, n48, n52, n56, n60, n64},
        oneHalf                          ENUMERATED
{n4, n8, n12, n16, n20, n24, n28, n32, n36, n40, n44, n48, n52, n56, n60, n64},
        one                              ENUMERATED
{n4, n8, n12, n16, n20, n24, n28, n32, n36, n40, n44, n48, n52, n56, n60, n64},
        two                              ENUMERATED
{n4, n8, n12, n16, n20, n24, n28, n32},
        four                             INTEGER (1..16),
        eight                            INTEGER (1..8),
        sixteen                          INTEGER (1..4)
    }
OPTIONAL,  -- Need M
    groupBconfigured                     SEQUENCE {
        ra-Msg3SizeGroupA                ENUMERATED {b56, b144, b208,
b256, b282, b480, b640,
                                                     b800, b1000, b72,
spare6, spare5, spare4, spare3, spare2, spare1},
        messagePowerOffsetGroupB         ENUMERATED { minusinfinity, dB0,
dB5, dB8, dB10, dB12, dB15, dB18},
        numberOfRA-PreamblesGroupA       INTEGER (1..64)
    }
OPTIONAL,  -- Need R
    ra-ContentionResolutionTimer         ENUMERATED {sf8, sf16, sf24,
sf32, sf40, sf48, sf56, sf64},
    rsrp-ThresholdSSB                    RSRP-Range
OPTIONAL,  --Need R
    rsrp-ThresholdSSB-SUL                RSRP-Range
OPTIONAL,  --Cond SUL
    prach-Root Sequence Index            CHOICE {
        1839                             INTEGER (0..837),
        1139                             INTEGER (0..137)
    },
``` |

-continued

| RACH-ConfigCommon IE | |
|---|---|
| msg1-SubcarrierSpacing OPTIONAL, -- Cond L139Need S | SubcarrierSpacing |
| msgA-preamble-SubcarrierSpacing OPTIONAL, --Cond L139Need S | SubcarrierSpacing |
|     msgA-pusch-SubcarrierSpacing OPTIONAL, -- Need R | SubcarrierSpacing |
|     restrictedSetConfig restrictedSetTypeA, restrictedSetTypeB}, | ENUMERATED {unrestrictedSet, |
|     msg3-transformPrecoder OPTIONAL, -- Need R ... } -- TAG-RACH-CONFIG-COMMON-STOP -- ASN1STOP | ENUMERATED {enabled} |

As a second embodiment, only one new parameter may be introduced in a signalling message (or messages, hereafter referred to as a first message) such as a RRC message. PUSCH in message A may use the numerology indicated by this new parameter. Preamble in message A may use the same numerology as the numerology for message 1 in 4-step RACH procedure. As an exemplary example, the new parameter may be defined in RACH-ConfigCommon IE as below.

msgA-pusch-SubcarrierSpacing

Subcarrier spacing of PUSCH in msgA when a 2-step RACH procedure is applied. Only the values 15, 30, or 60 kHz (<6 GHz), and 60 or 120 kHz (>6 GHz) are applicable.

For example, the updated RACH-ConfigCommon IE may be represented as below. The new parameter is highlighted with underlines.

| RACH-ConfigCommon IE | |
|---|---|
| -- ASN1START -- TAG-RACH-CONFIG-COMMON-START RACH-ConfigCommon ::= | SEQUENCE { |
|     rach-ConfigGeneric | RACH-ConfigGeneric, |
|     totalNumberOfRA-Preambles OPTIONAL, -- Need S | INTEGER (1..63) |
|     ssb-perRACH-OccasionAndCB-PreamblesPerSSB | CHOICE { |
|         oneEighth {n4, n8, n12, n16, n20, n24, n28, n32, n36, n40, n44, n48, n52, n56, n60, n64}, | ENUMERATED |
|         oneFourth {n4, n8, n12, n16, n20, n24, n28, n32, n36, n40, n44, n48, n52, n56, n60, n64}, | ENUMERATED |
|         oneHalf {n4, n8, n12, n16, n20, n24, n28, n32, n36, n40, n44, n48, n52, n56, n60, n64}, | ENUMERATED |
|         one {n4, n8, n12, n16, n20, n24, n28, n32, n36, n40, n44, n48, n52, n56, n60, n64}, | ENUMERATED |
|         two {n4, n8, n12, n16, n20, n24, n28, n32}, | ENUMERATED |
|         four | INTEGER (1..16), |
|         eight | INTEGER (1..8), |
|         sixteen } OPTIONAL, -- Need M | INTEGER (1..4) |
|     groupBconfigured | SEQUENCE { |
|         ra-Msg3SizeGroupA b256, b282, b480, b640, spare6, spare5, spare4, spare3, spare2, spare1}, | ENUMERATED {b56, b144, b208, b800, b1000, b72, |
|         messagePowerOffsetGroupB dB5, dB8, dB10, dB12, dB15, dB18}, | ENUMERATED { minusinfinity, dB0, |
|         numberOfRA-PreamblesGroupA } OPTIONAL, -- Need R | INTEGER (1..64) |
|     ra-ContentionResolutionTimer sf32, sf40, sf48, sf56, sf64}, | ENUMERATED { sf8, sf16, sf24, |
|     rsrp-ThresholdSSB OPTIONAL, -- Need R | RSRP-Range |
|     rsrp-ThresholdSSB-SUL OPTIONAL, -- Cond SUL | RSRP-Range |
|     prach-Root Sequence Index | CHOICE { |
|         1839 | INTEGER (0..837), |
|         1139 }, | INTEGER (0..137) |

| RACH-ConfigCommon IE |  |
|---|---|
| msg1-SubcarrierSpacing<br>OPTIONAL,  -- Cond L139Need S | SubcarrierSpacing |
| msgA-pusch-SubcarrierSpacing<br>OPTIONAL,   --Need R | SubcarrierSpacing |
| restrictedSetConfig<br>restrictedSetTypeA, restrictedSet TypeB}, | ENUMERATED {unrestrictedSet, |
| msg3-transformPrecoder<br>OPTIONAL,  Need R<br>...<br>}<br>-- TAG-RACH-CONFIG-COMMON-STOP<br>-- ASN1STOP | ENUMERATED { enabled} |

As another exemplary example, the new parameter may be defined in BWP IE as below.
msgA-pusch-SubcarrierSpacing
Subcarrier spacing of PUSCH in msgA when a 2-step RACH procedure is applied. Only the values 15, 30, or 60 kHz (<6 GHz), and 60 or 120 kHz (>6 GHz) are applicable.

For example, the updated BWP IE may be represented as below. The new parameter is highlighted with underlines.

| BWP IE |  |
|---|---|
| -- ASN1START<br>-- TAG-BANDWIDTH-PART-START |  |
| BWP ::=<br>locationAndBandwidth<br>subcarrierSpacing<br>subcarrierSpacingMsgApusch<br>OPTIONAL    -- Need R | SEQUENCE {<br>INTEGER (0..37949),<br>SubcarrierSpacing,<br>SubcarrierSpacing, |
| cyclicPrefix<br>OPTIONAL    -- Need R<br>}<br>-- TAG-BANDWIDTH-PART-STOP<br>-- ASN1STOP | ENUMERATED { extended} |

As a third embodiment, one new parameter may be introduced in a signalling message (or messages) such as a RRC message. Preamble in message A may use the numerology indicated by this new parameter. PUSCH in message A may use the same numerology as the numerology for message 3 in 4-step RACH procedure. As an exemplary example, the new parameter may be defined in RACH-ConfigCommon IE as below.

msgA-preamble-SubcarrierSpacing

Subcarrier spacing of preamble in msgA when a 2-step RACH procedure is applied. Only the values 15 or 30 kHz (<6 GHz), 60 or 120 kHz (>6 GHz) are applicable. Corresponds to L1 parameter 'prach-Msg1SubcarrierSpacing' (see 3GPP technical specification (TS) 38.211, section FFS_Section). If absent, the UE applies the SCS as derived from the prach-ConfigurationIndex in RACH-ConfigGeneric (see tables Table 6.3.3.1-1 and Table 6.3.3.2-2, TS 38.211). The value also applies to contention free random access (RACH-ConfigDedicated), to SI-request and to contention based beam failure recovery (CB-BFR). But it does not apply for contention free beam failure recovery (CF-BFR) (see BeamFailureRecoveryConfig).

For example, the updated RACH-ConfigCommon IE may be represented as below. The new parameter is highlighted with underlines.

| RACH-ConfigCommon IE |  |
|---|---|
| -- ASN1START<br>-- TAG-RACH-CONFIG-COMMON-START |  |
| RACH-ConfigCommon ::=<br>rach-ConfigGeneric<br>totalNumberOfRA-Preambles<br>OPTIONAL,   -- Need S | SEQUENCE {<br>RACH-ConfigGeneric,<br>INTEGER (1..63) |
| ssb-perRACH-OccasionAndCB-PreamblesPerSSB<br>oneEighth | CHOICE {<br>ENUMERATED |
| {n4, n8, n12, n16, n20, n24, n28, n32, n36, n40, n44, n48, n52, n56, n60, n64},<br>oneFourth | ENUMERATED |
| {n4, n8, n12, n16, n20, n24, n28, n32, n36, n40, n44, n48, n52, n56, n60, n64},<br>oneHalf | ENUMERATED |
| {n4, n8, n12, n16, n20, n24, n28, n32, n36, n40, n44, n48, n52, n56, n60, n64},<br>one | ENUMERATED |
| { n4, n8, n12, n16, n20, n24, n28, n32, n36, n40, n44, n48, n52, n56, n60, n64},<br>two | ENUMERATED |
| {n4, n8, n12, n16, n20, n24, n28, n32},<br>four<br>eight<br>sixteen<br>}<br>OPTIONAL,  -- Need M | INTEGER (1..16),<br>INTEGER (1..8),<br>INTEGER (1..4) |
| groupBconfigured<br>ra-Msg3SizeGroupA<br>b256, b282, b480, b640, | SEQUENCE {<br>ENUMERATED {b56, b144, b208,<br>b800, b1000, b72, |
| spare6, spare5, spare4, spare3, spare2, spare1},<br>messagePowerOffsetGroupB | ENUMERATED { minusinfinity, dB0, |

-continued

| RACH-ConfigCommon IE | |
|---|---|
| dB5, dB8, dB10, dB12, dB15, dB18}, | |
| numberOfRA-PreamblesGroupA | INTEGER (1..64) |
| } | |
| OPTIONAL,    -- Need R | |
| ra-ContentionResolutionTimer | ENUMERATED { sf8, sf16, sf24, |
| sf32, sf40, sf48, sf56, sf64}, | |
| rsrp-ThresholdSSB | RSRP-Range |
| OPTIONAL,    -- Need R | |
| rsrp-ThresholdSSB-SUL | RSRP-Range |
| OPTIONAL,    -- Cond SUL | |
| prach-Root Sequence Index | CHOICE { |
| 1839 | INTEGER (0..837), |
| 1139 | INTEGER (0..137) |
| }, | |
| msg1-SubcarrierSpacing | SubcarrierSpacing |
| OPTIONAL,  -- Cond L139Need S | |
| msgA-preamble-SubcarrierSpacing | SubcarrierSpacing |
| OPTIONAL,  -- Cond L139Need S | |
| restrictedSetConfig | ENUMERATED {unrestrictedSet, |
| restrictedSetTypeA, restrictedSet TypeB}, | |
| msg3-transformPrecoder | ENUMERATED { enabled} |
| OPTIONAL,  -- Need R | |
| ... | |
| } | |
| -- TAG-RACH-CONFIG-COMMON-STOP | |
| -- ASN1STOP | |

As a fourth embodiment, no additional signaling is introduced for the numerologies of message A (hereafter refer to as a second message). Preamble in message A may use the numerology for message 1 and PUSCH in message A may use the numerology for message 3. Alternatively, fixed numerology may be always used for at least one of PUSCH and preamble.

As a fifth embodiment, the subcarrier spacing of PUSCH in message A may be the same as an SCS of the preamble in message A when a short preamble (L=139) is used.

Figure 3:
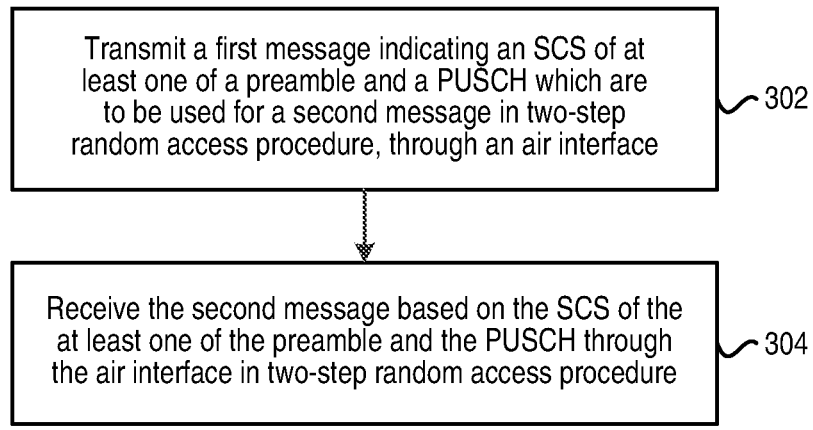
FIG. 3 is a flowchart illustrating a method in a base station according to an embodiment of the disclosure.

Hereinafter, the solutions will be further described with reference to FIGS. 3-7. FIG. 3 is a flowchart illustrating a method in a base station according to an embodiment of the disclosure. At block 302, the base station transmits a first message indicating an SCS of at least one of a preamble and a PUSCH which are to be used for a second message in two-step random access procedure, through an air interface. The second message may refer to message A in two-step random access procedure. The subcarrier spacing (SCS) may refer to the spacing in frequency domain between 2 subcarriers in one orthogonal frequency division multiplexing (OFDM) symbol. The first message may indicate the SCS in various ways. For example, the first message may include at least one of a first parameter indicating the SCS of the preamble and a second parameter indicating the SCS of the PUSCH. That is, there may be three options. As the first option, the first message includes both the first parameter and the second parameter. As the second option, the first message includes the second parameter but does not include the first parameter. As the third option, the first message includes the first parameter but does not include the second parameter. Optionally, the first parameter may be configured to be applicable to a terminal device when a short preamble is used by the terminal device. Further, optionally, the first parameter may be configured to have the same value as the second parameter.

In a case that the first message is a RRC message, the first parameter may be a parameter in a RACH-ConfigCommon information element (IE) and the second parameter may be a parameter in a RACH-ConfigCommon IE or a BWP IE.

Note that the RRC message is merely an exemplary example and the first message may take any other suitable form (e.g. SIB1 message) depending on the specific application scenario.

At block 304, the base station receives the second message based on the SCS of the at least one of the preamble and the PUSCH through the air interface in two-step random access procedure. In the above first option where the first message indicates both the SCS of the preamble and the SCS of the PUSCH, the second message may be received based on the two SCSs indicated by the first message. In the above second option where the first message indicates the SCS of the PUSCH, the second message may be received based on the indicated SCS of the PUSCH and an SCS of a preamble which is predefined to be either fixed or the same as an SCS used for message 1 in four-step random access procedure. In the above third option where the first message indicates the SCS of the preamble, the second message may be received based on the indicated SCS of the preamble and an SCS of a PUSCH which is predefined to be either fixed or the same as an SCS used for message 3 in four-step random access procedure. In this way, the preamble can be detected and/or the PUSCH can be decoded by the base station during reception of the second message in two-step random access procedure.

Figure 4:
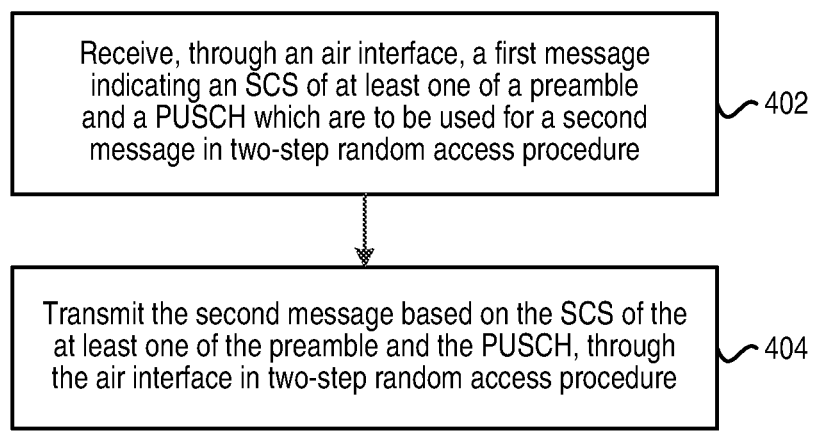
FIG. 4 is a flowchart illustrating a method in a terminal device according to an embodiment of the disclosure.

FIG. 4 is a flowchart illustrating a method in a terminal device according to an embodiment of the disclosure. At block 402, the terminal device receives, through an air interface, a first message indicating an SCS of at least one of a preamble and a PUSCH which are to be used for a second message in two-step random access procedure. Block 402 corresponds to block 302 and the details thereof are omitted here for brevity.

At block 404, the terminal device transmits the second message based on the SCS of the at least one of the preamble and the PUSCH, through the air interface in two-step random access procedure. In the above first option where the first message indicates both the SCS of the preamble and the SCS of the PUSCH, the second message may be transmitted based on the two SCSs indicated by the first message. In the above second option where the first message indicates the SCS of the PUSCH, the second message may be transmitted based on the indicated SCS of the PUSCH and an SCS of a preamble which is predefined to be either fixed or the same as an SCS used for message 1 in four-step random access procedure. In the above third option where the first message indicates the SCS of the preamble, the second message may be transmitted based on the indicated SCS of the preamble and an SCS of a PUSCH which is predefined to be either fixed or the same as an SCS used for message 3 in four-step random access procedure. Optionally, the second message may be transmitted based on the SCS of the preamble indicated by the first parameter when a short preamble is used by the terminal device. Further, optionally, the received first parameter may be configured to have the same value as the received second parameter.

FIG. 5 is a flowchart illustrating a method in a base station according to another embodiment of the disclosure. At block 502, the base station receives a request message through an air interface in two-step random access procedure based on an SCS of a preamble and an SCS of a PUSCH. The SCS of the preamble is predefined to be either fixed or the same as an SCS used for message 1 in four-step random access procedure. The SCS of the PUSCH is predefined to be either fixed or the same as an SCS used for message 3 in four-step random access procedure. Since the two SCSs are predefined for the base station, no additional signaling needs to be introduced in message A.

FIG. 6 is a flowchart illustrating a method in a terminal device according to another embodiment of the disclosure. At block 602, the terminal device transmits a request message through an air interface in two-step random access procedure based on an SCS of a preamble and an SCS of a PUSCH. The SCS of the preamble is predefined to be either fixed or the same as an SCS used for message 1 in four-step random access procedure. The SCS of the PUSCH is predefined to be either fixed or the same as an SCS used for message 3 in four-step random access procedure. Since the two SCSs are predefined for the terminal device, no additional signaling needs to be introduced in message A. It should be noted that two blocks shown in succession in the figures may, in fact, be executed substantially concurrently, or the blocks may sometimes be executed in the reverse order, depending upon the functionality involved.

FIG. 7 is a flowchart illustrating a method in a base station according to another embodiment of the disclosure. At block 702, the base station transmits a first message indicating an SCS of at least one of a preamble and a PUSCH which are to be used for a second message in two-step random access procedure, through an air interface. The SCS of the PUSCH is the same as an SCS used for message 3 in four-step random access procedure. For example, the SCS of the PUSCH may be predefined between the base station and a terminal device. Thus, there is no need to indicate the SCS of the PUSCH in the first message. However, it is also possible to indicate the SCS of the PUSCH in the first message if the SCS of the PUSCH is only predefined in the base station. For example, the first message may be a RRC message or SIB1 message and the second message may be message A in two step random access procedure. At block 704, the base station receives the second message based on the SCS of the PUSCH through the air interface in two-step random access procedure.

Figure 8:
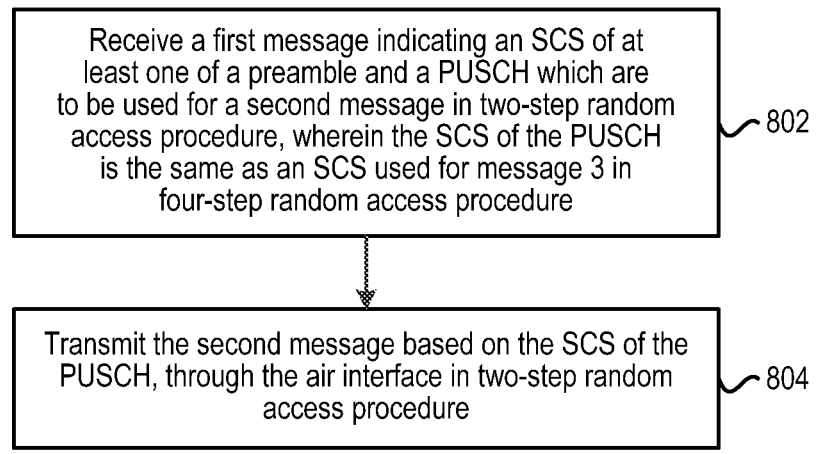
FIG. 8 is a flowchart illustrating a method in a terminal device according to another embodiment of the disclosure.

FIG. 8 is a flowchart illustrating a method in a terminal device according to another embodiment of the disclosure. At block 802, the terminal device receives, through an air interface, a first message indicating an SCS of at least one of a preamble and a PUSCH which are to be used for a second message in two-step random access procedure. The SCS of the PUSCH is the same as an SCS used for message 3 in four-step random access procedure. As described above, the SCS of the PUSCH may or may not be indicated in the signaling message. For example, the first message may be a RRC message or SIB1 message and the second message may be message A in two step random access procedure. At block 804, the terminal device transmits the second message based on the SCS of the PUSCH, through the air interface in two-step random access procedure.

Based on the above description, in at least one aspect, the present disclosure provides a method implemented in a communication system including a base station and a terminal device. The method comprises, at the base station, transmitting a first message indicating an SCS of at least one of a preamble and a PUSCH which are to be used for a second message in two-step random access procedure, through an air interface. The SCS of the PUSCH is the same as an SCS used for message 3 in four-step random access procedure. The method further comprises, at the terminal device, receiving, through an air interface, the first message indicating the SCS of at least one of the preamble and the PUSCH which are to be used for the second message in two-step random access procedure. The method further comprises, at the terminal device, transmitting the second message based on the SCS of the PUSCH, through the air interface in two-step random access procedure. The method further comprises, at the base station, receiving the second message based on the SCS of the PUSCH through the air interface in two-step random access procedure.

Figure 9:
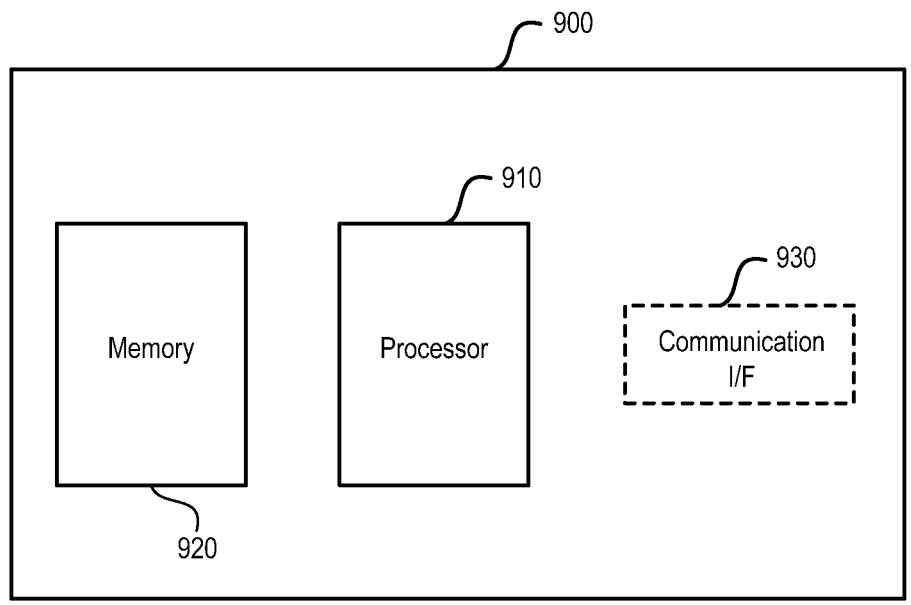
FIG. 9 is a block diagram showing an apparatus suitable for use in practicing some embodiments of the disclosure.

FIG. 9 is a block diagram showing an apparatus suitable for use in practicing some embodiments of the disclosure. For example, any one of the terminal device and the base station described above may be implemented through the apparatus 900. As shown, the apparatus 900 may include a processor 910, a memory 920 that stores a program, and optionally a communication interface 930 for communicating data with other external devices through wired and/or wireless communication.

The program includes program instructions that, when executed by the processor 910, enable the apparatus 900 to operate in accordance with the embodiments of the present disclosure, as discussed above. That is, the embodiments of the present disclosure may be implemented at least in part by computer software executable by the processor 910, or by hardware, or by a combination of software and hardware.

The memory 920 may be of any type suitable to the local technical environment and may be implemented using any suitable data storage technology, such as semiconductor based memory devices, flash memories, magnetic memory devices and systems, optical memory devices and systems, fixed memories and removable memories. The processor 910 may be of any type suitable to the local technical environment, and may include one or more of general purpose computers, special purpose computers, microprocessors, digital signal processors (DSPs) and processors based on multi-core processor architectures, as non-limiting examples.

As another embodiment, the base station may comprise a transmission module and a reception module. The transmission module may be configured to transmit a first message indicating an SCS of at least one of a preamble and a PUSCH which are to be used for a second message in two-step random access procedure, through an air interface, as described above with respect to block 302. The reception module may be configured to receive the second message based on the SCS of the at least one of the preamble and the PUSCH through the air interface in two-step random access procedure, as described above with respect to block 304.

As another embodiment, the terminal device may comprise a reception module and a transmission module. The reception module may be configured to receive, through an air interface, a first message indicating an SCS of at least one of a preamble and a PUSCH which are to be used for a second message in two-step random access procedure, as described above with respect to block 402. The transmission module may be configured to transmit the second message based on the SCS of the at least one of the preamble and the PUSCH, through the air interface in two-step random access procedure, as described above with respect to block 404.

As another embodiment, the base station may comprise a reception module. The reception module may be configured to receive a request message through an air interface in two-step random access procedure based on an SCS of a preamble and an SCS of a PUSCH, as described above with respect to block 502. The SCS of the preamble is predefined to be either fixed or the same as an SCS used for message 1 in four-step random access procedure. The SCS of the PUSCH is predefined to be either fixed or the same as an SCS used for message 3 in four-step random access procedure.

As another embodiment, the terminal device may comprise a transmission module. The transmission module may be configured to transmit a request message through an air interface in two-step random access procedure based on an SCS of a preamble and an SCS of a PUSCH, as described above with respect to block 602. The SCS of the preamble is predefined to be either fixed or the same as an SCS used for message 1 in four-step random access procedure. The SCS of the PUSCH is predefined to be either fixed or the same as an SCS used for message 3 in four-step random access procedure.

As another embodiment, the base station may comprise a transmission module and a reception module. The transmission module may be configured to transmit a first message indicating an SCS of at least one of a preamble and a PUSCH which are to be used for a second message in two-step random access procedure, through an air interface. The SCS of the PUSCH may be the same as an SCS used for message 3 in four-step random access procedure. The reception module may be configured to receive the second message based on the SCS of the PUSCH through the air interface in two-step random access procedure.

As another embodiment, the terminal device may comprise a reception module and a transmission module. The reception module may be configured to receive, through an air interface, a first message indicating an SCS of at least one of a preamble and a PUSCH which are to be used for a second message in two-step random access procedure. The SCS of the PUSCH may be the same as an SCS used for message 3 in four-step random access procedure. The transmission module may be configured to transmit the second message based on the SCS of the PUSCH, through the air interface in two-step random access procedure. The modules described above may be implemented by hardware, or software, or a combination of both.

Figure 10:
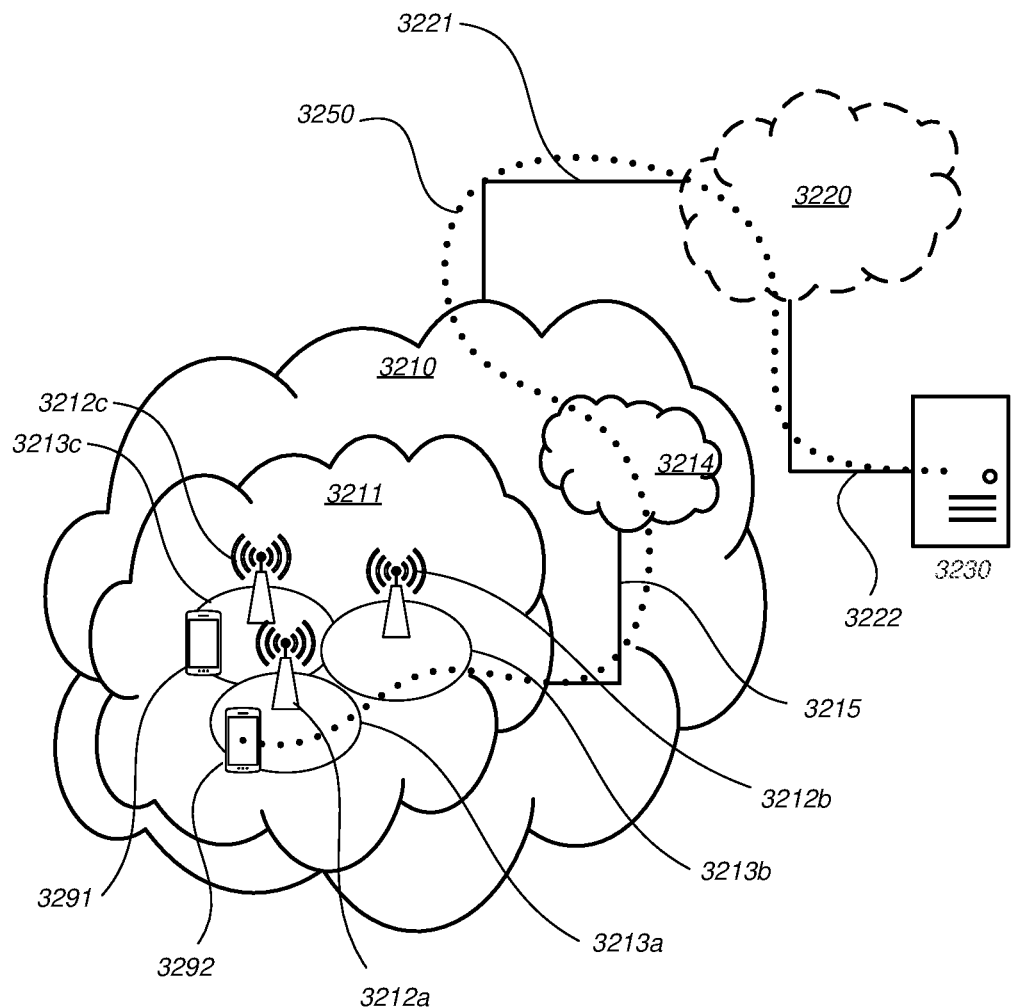
FIG. 10 is a diagram showing a telecommunication network connected via an intermediate network to a host computer in accordance with some embodiments.

With reference to FIG. 10, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 10 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 11) served by base station 3320. Communication interface 3326 may be configured to facilitate connection 3360 to host computer 3310. Connection 3360 may be direct or it may pass through a core network (not shown in FIG. 11) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 11:
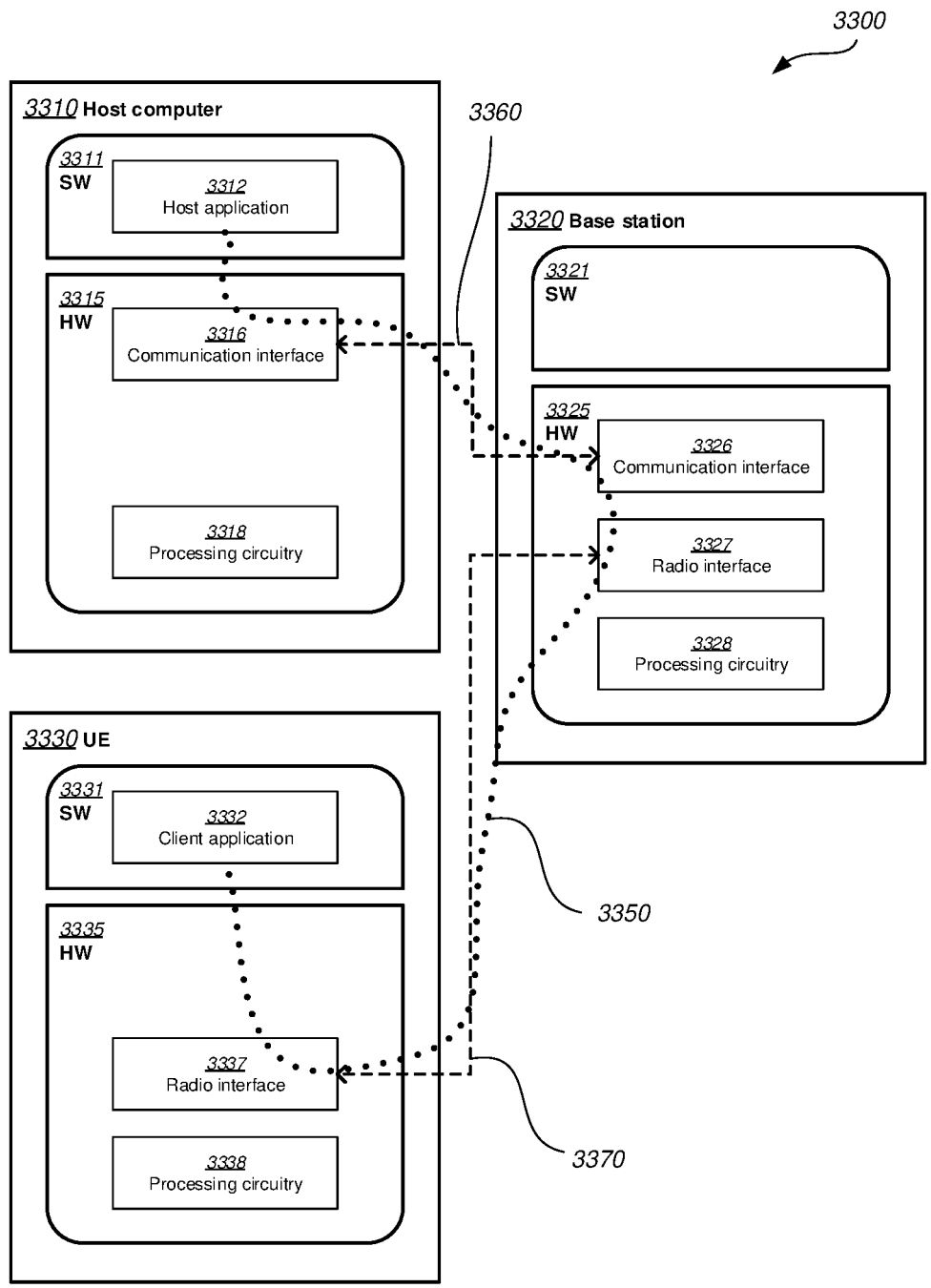
FIG. 11 is a diagram showing a host computer communicating via a base station with a user equipment in accordance with some embodiments.

It is noted that host computer 3310, base station 3320 and UE 3330 illustrated in FIG. 11 may be similar or identical to host computer 3230, one of base stations 3212*a*, 3212*b*, 3212*c* and one of UEs 3291, 3292 of FIG. 10, respectively. This is to say, the inner workings of these entities may be as shown in FIG. 11 and independently, the surrounding network topology may be that of FIG. 10.

In FIG. 11, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 12:
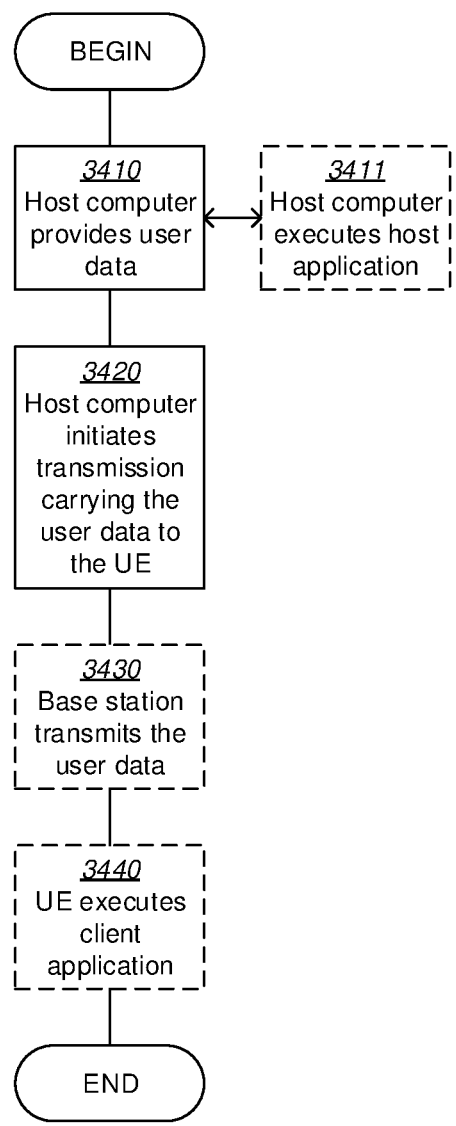
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 13:
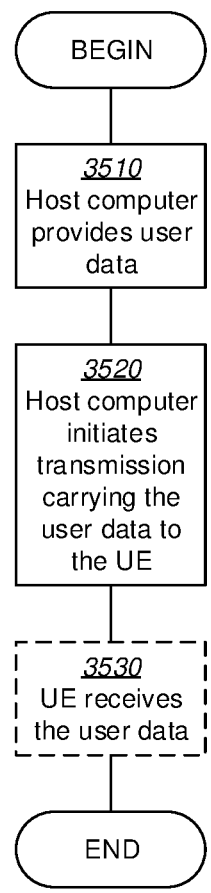
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 14:
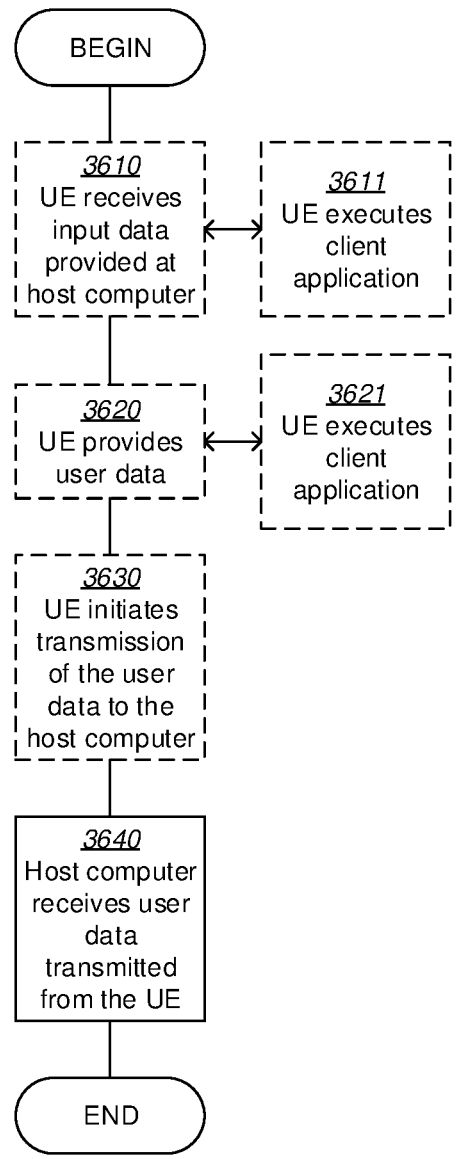
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 15:
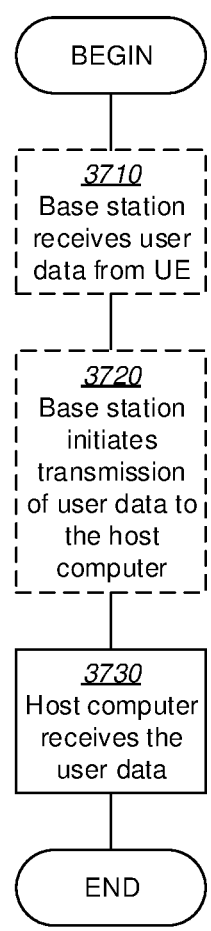
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a base station, comprising:

transmitting, to a terminal device through an air interface, a first message having a first parameter indicating a subcarrier spacing (SCS) of a preamble and a second parameter indicating a SCS of a physical uplink shared channel (PUSCH), wherein the first and second parameters are used by the terminal device for transmitting message A in a two-step random access procedure, wherein the first message is a radio resource control (RRC) message or a system information block type 1 (SIB1) message, and wherein the SCS of the PUSCH is same as an SCS used for message 3 in a four-step random access procedure; and receiving, from the terminal device through the air interface in the two-step random access procedure, the message A based on the SCS of the preamble and the SCS of the PUSCH transmitted in the first message.

2. A method in a terminal device, comprising:

receiving, from a base station through an air interface, a first message having a first parameter indicating a subcarrier spacing (SCS) of a preamble and a second parameter indicating a SCS of a physical uplink shared channel, (PUSCH), wherein the first and second parameters are used by the terminal device for transmitting message A in a two-step random access procedure, wherein the first message is a radio resource control (RRC) message or a system information block type 1 (SIB1) message, and wherein the SCS of the PUSCH is same as an SCS used for message 3 in a four-step random access procedure; and transmitting, to the base station through the air interface in the two-step random access procedure, the message A based on the SCS of the preamble and the SCS of the PUSCH received in the first message.

3. A base station comprising:

at least one processor; and at least one memory, the at least one memory containing instructions which, when executed by the at least one processor, cause the base station to:

transmit, to a terminal device through an air interface, a first message having a first parameter indicating a subcarrier spacing (SCS) of a preamble and a second parameter indicating a SCS of a physical uplink shared channel (PUSCH), wherein the first and second parameters are used by the terminal device for transmitting message A in a two-step random access procedure, wherein the first message is a radio resource control (RRC) message or a system information block type 1 (SIB 1) message, and wherein the SCS of the PUSCH is same as an SCS used for message 3 in a four-step random access procedure; and receive, from the terminal device through the air interface in the two-step random access procedure, the message A based on the SCS of the preamble and the SCS of the PUSCH transmitted in the first message.

4. A terminal device comprising:

at least one processor; and at least one memory, the at least one memory containing instructions which, when executed by the at least one processor, cause the terminal device to:

receive, from a base station through an air interface, a first message having a first parameter indicating a subcarrier spacing (SCS) of a preamble and a second parameter indicating a SCS of a physical uplink shared channel (PUSCH), wherein the first and second parameters are used by the terminal device for transmitting message A in a two-step random access procedure, wherein the first message is a radio resource control (RRC) message or a system information block type 1 (SIB1) message, and wherein the SCS of the PUSCH is same as an SCS used for message 3 in a four-step random access procedure; and transmit, to the base station through the air interface in the two-step random access procedure, the message A based on the SCS of the preamble and the SCS of the PUSCH received in the first message.

* * * * *